United States Patent
Sipola

(10) Patent No.: US 7,254,412 B2
(45) Date of Patent: Aug. 7, 2007

(54) DATA TRANSMISSION METHOD AND RADIO SYSTEM

(75) Inventor: Jussi Sipola, Oulu (FI)

(73) Assignee: Nokia Corporation, Espoo (FI)

( * ) Notice: Subject to any disclaimer, the term of this patent is extended or adjusted under 35 U.S.C. 154(b) by 541 days.

(21) Appl. No.: 10/450,998

(22) PCT Filed: Dec. 18, 2001

(86) PCT No.: PCT/FI01/01122

§ 371 (c)(1),
(2), (4) Date: Jun. 19, 2003

(87) PCT Pub. No.: WO02/50679

PCT Pub. Date: Jun. 27, 2002

(65) Prior Publication Data

US 2005/0101249 A1 May 12, 2005

(30) Foreign Application Priority Data

Dec. 20, 2000 (FI) .................................. 20002805

(51) Int. Cl.
*H04B 7/00* (2006.01)
*H04Q 7/20* (2006.01)
(52) U.S. Cl. .................. 455/509; 455/450; 455/452.1; 370/235; 370/468; 370/473; 714/20; 714/748; 714/767; 714/776
(58) Field of Classification Search ................ 370/231, 370/235, 229, 236, 310, 410, 464, 468, 345, 370/394, 552, 216, 442, 349, 392, 473, 474; 714/18, 20, 701, 719, 747, 748, 767, 776; 455/403, 509, 450, 452.1, 414.1

See application file for complete search history.

(56) References Cited

U.S. PATENT DOCUMENTS

| 4,759,022 | A | | 7/1988 | Åkerberg |
| 4,764,928 | A | | 8/1988 | Åkerberg |
| 4,908,828 | A | * | 3/1990 | Tikalsky ..................... 714/822 |
| 5,432,798 | A | * | 7/1995 | Blair .......................... 714/748 |

(Continued)

FOREIGN PATENT DOCUMENTS

| EP | 1 137 217 A1 | 9/2001 |
| WO | WO 00/45543 | 8/2000 |

*Primary Examiner*—Matthew D. Anderson
*Assistant Examiner*—Sujatha Sharma
(74) *Attorney, Agent, or Firm*—Squire, Sanders & Dempsey L.L.P.

(57) ABSTRACT

The invention relates to a data transmission method and a radio system that comprises a first (260) transceiver and a second transceiver (264) that are in radio contact with each other. The first transceiver (260) comprises means (500, 504) for forming data blocks for transmission in such a manner that the data blocks are given identifiers for identification. The second transceiver (264) comprises means (512) for receiving data blocks transmitted and retransmitted by the first transceiver, and means (524) for detecting a failure in receiving a data block. The second transceiver (264) comprises means (530) for maintaining information on the position of a window belonging to a finite identifier space, and means (524) for comparing the identifiers of the re-received data block and the earlier received data block with each other and for defining the data blocks as the same, and means (524) for combining the data blocks defined as the same.

17 Claims, 7 Drawing Sheets

U.S. PATENT DOCUMENTS

| | | | |
|---|---|---|---|
| 5,794,124 A * | 8/1998 | Ito et al. ..................... 340/7.44 |
| 5,930,233 A | 7/1999 | Kanerva et al. |
| 6,105,064 A | 8/2000 | Davis et al. |
| 6,151,314 A * | 11/2000 | Rauhala ..................... 370/350 |
| 6,301,681 B1 * | 10/2001 | Chen et al. .................. 714/751 |
| 6,529,561 B2 * | 3/2003 | Sipola ........................ 375/295 |
| 6,865,163 B1 * | 3/2005 | Bergenwall et al. ........ 370/288 |
| 6,925,096 B2 * | 8/2005 | Haartsen ..................... 370/473 |
| 6,992,982 B1 * | 1/2006 | Meyer et al. ............... 370/231 |

\* cited by examiner

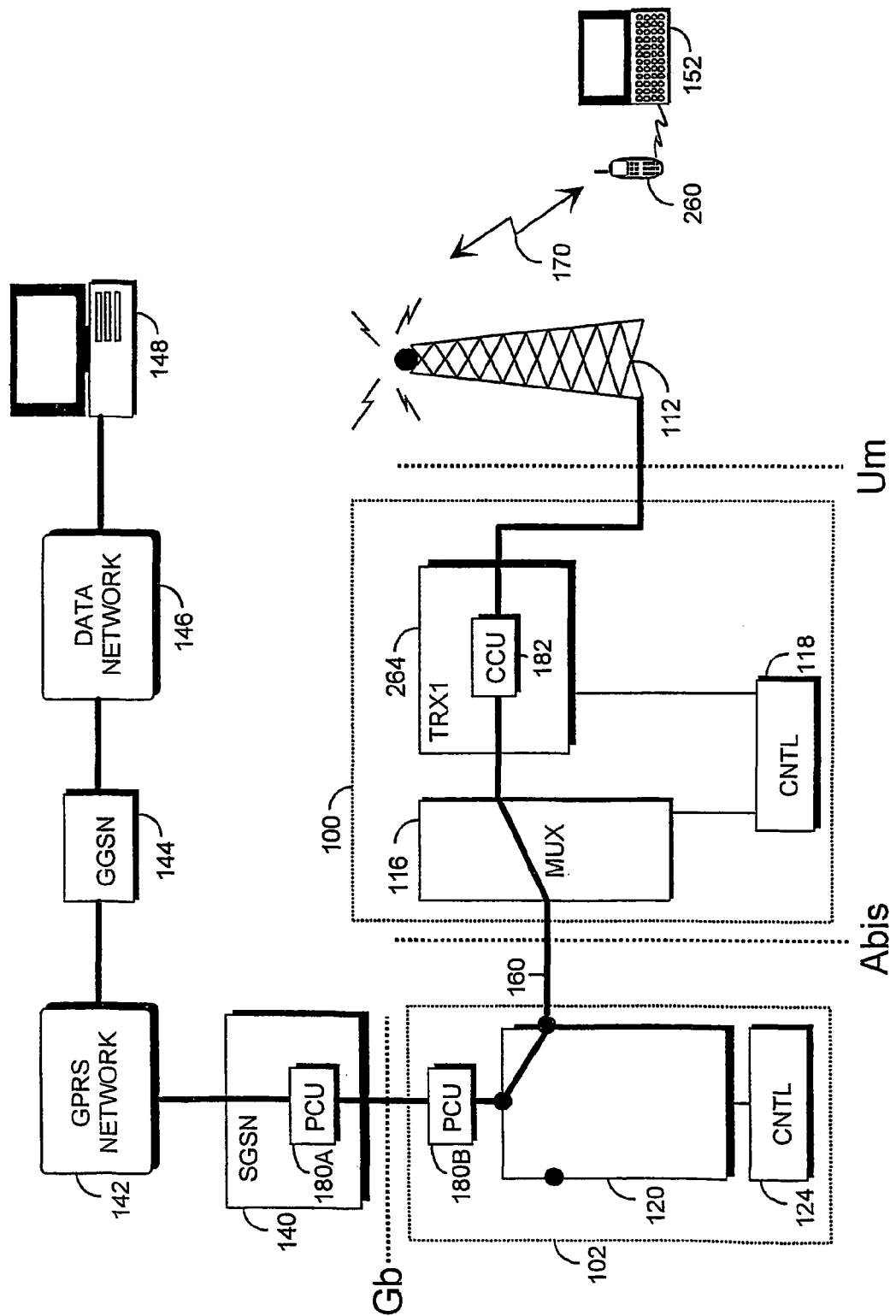

| TIME | DATA BLOCK | RESULT | WINDOW 0 1 2 3 | MEMORY CONTENTS |
|---|---|---|---|---|
| 0 | 0 | OK | W W | - |
| 1 | 1 | ERR | W W | 1 |
| 2 | 1 | OK | W W | - |
| 3 | 1 | ERR | W W | 1 |
| 4 | 2 | ERR | _ W W | 1,2 |
| 5 | 2 | OK | _ W W | 1 |
| 6 | 3 | OK | _ _ W W | - |
| 7 | 0 | OK | W _ _ W | - |
| 8 | 1 | OK | W W | - |
| 9 | 2 | OK | _ W W | - |

Fig 2

| TIME | DATA BLOCK | RESULT | WINDOW 0 1 2 3 | MEMORY CONTENTS |
|---|---|---|---|---|
| 0 | 0 | OK  | O W . . | – |
| 1 | 1 | ERR | O W . . | 1 |
| 2 | 1 | OK  | O O . . | – |
| 3 | 1 | ERR | O O . . | – |
| 4 | 2 | ERR | . O W . | 2 |
| 5 | 2 | OK  | . O O . | – |
| 6 | 3 | OK  | . . O O | – |
| 7 | 0 | OK  | O . . O | – |
| 8 | 1 | OK  | O O . . | – |
| 9 | 2 | OK  | . O O . | – |

Fig 4

DATA TRANSMISSION METHOD AND RADIO SYSTEM

FIELD OF THE INVENTION

The invention relates to a method of transmitting data blocks in a radio system from a first transceiver to a second transceiver, and to a radio system employing the method. Both the method and the radio system employing the method are especially suited for EGPRS (Enhanced General Packet Radio Service).

BACKGROUND OF THE INVENTION

Transmitters and receivers used in a radio system typically form transceivers, examples of which include transceivers in subscriber terminals, such as mobile phones, and transceivers of a base station.

The aim in data transmission is often to ensure its success between transceivers. Digital data transmission often uses retransmitting error correction, in which the sender is notified of transmission errors, who then retransmits the erroneous information. One known method is Selective Reject ARQ (Automatic Repeat reQuest), in which a transmitter can transmit a new block before the previous one is acknowledged and the transmitter can retransmit only the blocks whose reception fails. A group of data frames that the transmitter can transmit consecutively without acknowledgement from the receiver is in this protocol called a transmission window.

EGPRS (Enhanced General Packet Radio Service) is a GSM-based (Global System for Mobile Communications) system utilising packet-switched transmission. EGPRS uses EDGE (Enhanced Data Rates for GSM Evolution) technology to increase data transmission capacity. In addition to GMSK (Gaussian Minimum-Shift Keying) modulation normally used in GMS, 8-PSK (8-Phase Shift Keying) modulation can be used for packet data channels. The aim is mainly to implement non-real-time data transmission services, such as file copying and the use of an Internet browser. The aim is also to implement packet-switched real-time services for instance to transmit speech and video. In principle, the data transmission capacity can vary from a few kilobits per second up to 400 kilobits per second.

Let us now examine an example of error correction in the above-mentioned system on a connection between two transceivers. The first transceiver transmits data in data blocks to the second transceiver. The first transceiver attaches identifiers to the data blocks to be transmitted for identification during reception in such a manner that the identifiers are reserved from a finite identifier space. The identifiers are reserved cyclically in such a manner that when the last identifier is used, the cycle starts again from the beginning. When the reception of a data block fails in the second transceiver, the block needs to be retransmitted. The bi-directional connection between the first and the second transceiver makes it possible for the second transceiver to transmit a retransmission request to the first transceiver. On the basis of the received retransmission request, the first transceiver retransmits the data block to the second transceiver that identifies the block as a retransmission of the earlier failed block on the basis of the identifier. The second transceiver maintains information on the position of a receiver window related to the ARQ protocol. The window is a part of the identifier space and always begins from the first block that has not yet been correctly received. Typically, the size of the window is half of the identifier space. If the second transceiver receives a block whose identifier is not in the window, it knows that said block has already been received once and it can be disregarded.

To further improve performance, it is possible to use an incremental redundancy, in which the second transceiver is equipped with a receiver memory to which all data blocks whose reception failed are stored. Failure in reception may be caused by the fact, for instance, that the conditions of the used radio channel change so quickly that it is impossible for the radio system to optimally select a code rate in advance for the incoming transmission. The use of the incremental redundancy allows for a better adaptation to changing conditions. Data blocks whose reception failed are retransmitted from the first transceiver. Retransmitted data blocks and stored data blocks having the same identifiers are combined, after which the second transceiver decodes the combined data blocks. During the combination, the amount of information available for decoding increases in comparison with the amount of information in a single data block, so decoding has a higher probability of success.

The intention thus is to combine the different transmissions of the same data block. That the data blocks are the same is determined from the fact that they have the same identifiers.

The cycling of identifiers causes a problem, because when data blocks are compared with each other, data blocks may be found with the same identifiers, even though the data blocks are actually different. In the data transmission described above, it is possible that data blocks having the same identifier are erroneously considered the same for combination purposes, even though they are different. When different data blocks are combined, transceiver operation fails.

Another problem is caused by the fact that the incremental redundancy (IR) combination is done before channel coding, whereas the Selective Reject ARQ protocol operates on a higher protocol layer. In practice, the IR combination and ARQ protocol can reside physically in different places or devices, in which case the information in the ARQ protocol cannot be used in the IR combination.

BRIEF DESCRIPTION OF THE INVENTION

It is thus an object of the invention to provide a method and a radio system implementing the method so as to avoid combining wrong data blocks. This is achieved by a method of transmitting data blocks in a radio system from a first transceiver to a second transceiver, in which method the first transceiver attaches identifiers to the data blocks to be transmitted for identification, the identifiers being reserved cyclically from a finite identifier space, the second transceiver receives the data blocks, and when the reception of a data block fails, the second transceiver stores the data block into a reception memory and the first transceiver retransmits said data block with the same identifier as the original transmission and the second transceiver re-receives said data block.

In the method, the second transceiver maintains information on the position of a window belonging to the finite identifier space; when the second transceiver re-receives the data block, the identifiers of the re-received data block and the earlier received data block are compared with each other, and the data blocks are defined as the same, if they have the same identifier and it is detected that said identifier has been in the window maintained by the second transceiver continuously from the reception time of the earlier received data block to the reception time of the re-received data block; the second transceiver combines the data blocks defined as the same.

The invention also relates to a radio system comprising a first and a second transceiver that are in radio contact with each other; the first transceiver comprises means for forming data blocks for transmission in such a manner that the data blocks are given identifiers for identification, the identifiers being reserved cyclically from a finite identifier space, means for receiving a retransmission request transmitted by the second transceiver, and means for transmitting data blocks to the second transceiver and for re-transmitting a data block to the second transceiver; the second transceiver comprises means for receiving data blocks transmitted by the first transceiver and for receiving a data block retransmitted by the first transceiver, means for detecting a failure in the reception of a data block, a reception memory to which a data block whose reception fails is stored, and means for transmitting to the first transceiver a retransmission request of a data block.

The second transceiver comprises means for maintaining information on the position of a window belonging to the finite identifier space, and means for comparing the identifiers of the re-received data block and the earlier received data block with each other and for defining the data blocks as the same, if they have the same identifier and said identifier has been in the window maintained by the second transceiver continuously from the reception time of the earlier received data block to the reception time of the re-received data block, and means for combining data blocks defined as the same.

Preferred embodiments of the invention are disclosed in the dependent claims.

The invention is based on the idea that the second transceiver maintains a window in the identifier space and compares the identifiers of received data blocks with the identifiers in the window. When the transceiver receives a data block whose position according to the identifier is not in the window, the window is shifted in the identifier space to bring the position according to said identifier to the window following the window shift. If the data block is a re-received data block, the re-received data block and an earlier received data block having the same identifier and stored in the memory are considered the same, if the identifier has been in the window during the entire transmission-retransmission process. This way, it is possible to ensure that the blocks having the same identifier really contain the same information that can be combined.

The solutions according to the preferred embodiments of the invention provide several advantages. The solution prevent the combination of wrong data blocks, because only data blocks having the same identifier and within the same cycle, i.e. data blocks that truly are the same, are considered the same data blocks that can be combined. Thus, wrong data blocks are not combined and the connection quality can be improved.

BRIEF DESCRIPTION OF THE FIGURES

The invention will now be described in greater detail by means of preferred embodiments and with reference to the attached drawings, in which FIG. 1C shows a packet-switched transmission link, FIG. 2 shows an example of a method according a first preferred embodiment of the invention, FIG. 4 shows an example of a solution according to an embodiment of the invention.

DETAILED DESCRIPTION OF THE INVENTION

Figure 1A:
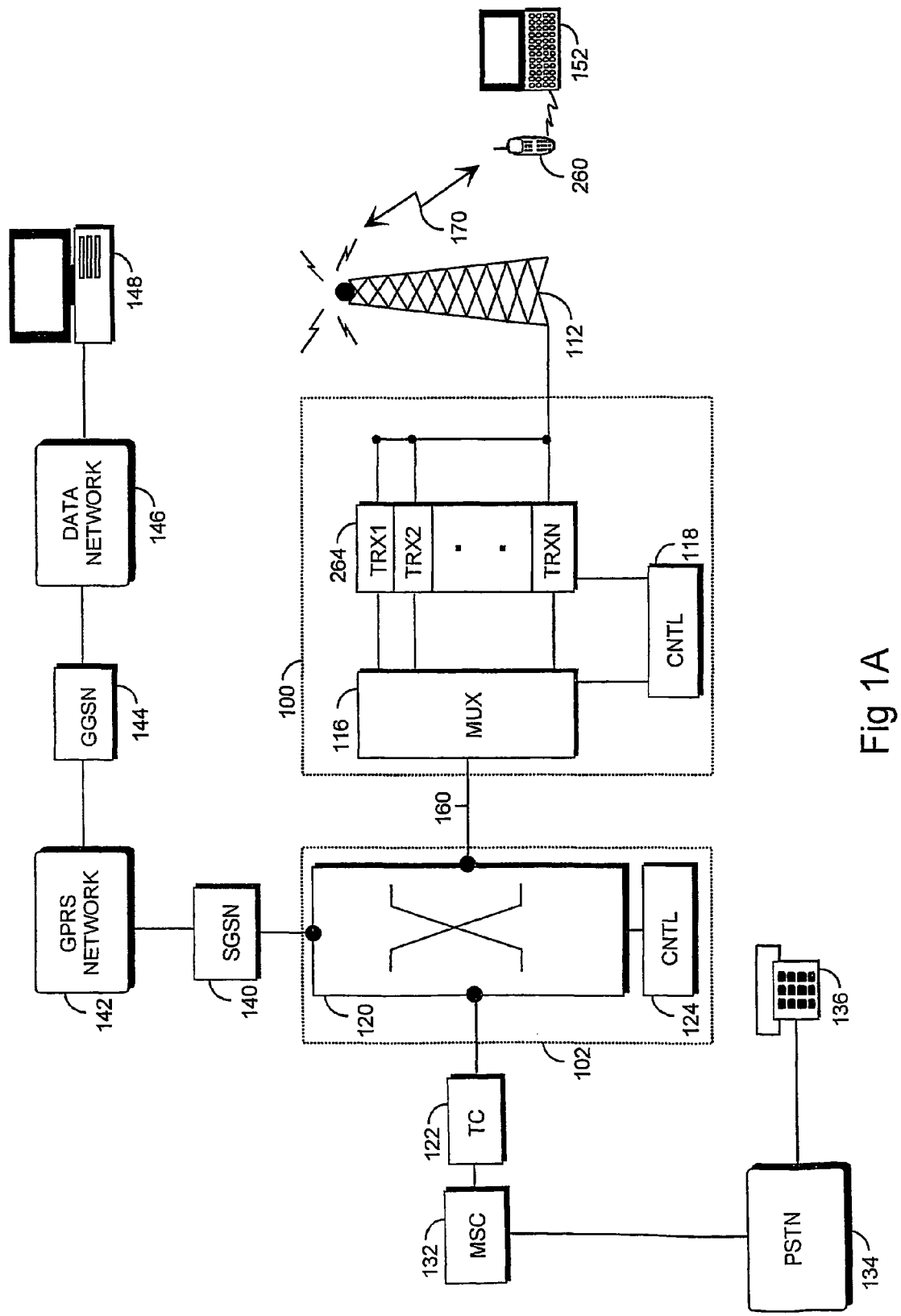
FIG. 1A shows a typical structure of a radio system according to the preferred embodiments of the invention.

A typical structure of a radio system according to the preferred embodiments and its interfaces with a fixed telephone network and a packet-switched network are described with reference to FIG. 1A. FIG. 1A only contains the blocks that are essential to explain the embodiments, but it is clear to a person skilled in the art that a conventional cellular packet network also contains other functions and structures that need not be explained in more detail herein. The invention is most preferably used in EGPRS. The invention operates on both uplink and downlink.

A cellular network typically comprises a fixed network infrastructure, i.e. a network part, and as transceivers 260 subscriber terminals that can be fixed, installed in a vehicle or portable terminals. The network part has base stations 100. A base station controller 102 connected to several base stations 100 controls them in a centralized manner. The base station 100 has transceivers 264. The base station 100 typically has one to sixteen transceivers 264. One transceiver 264 provides radio capacity for one TDMA (Time Division Multiple Access) frame, i.e. typically for eight time-slots.

The base station 100 has a control unit 118 that controls the operation of the transceivers 264 and a multiplexer 116. The multiplexer 116 places traffic and control channels used by several transceivers 264 on one transmission link 160. The structure of the transmission link 160 is exactly defined, and it is called an Abis interface.

The transceivers 264 of the base station 100 are connected to an antenna unit 112 that establishes a bi-directional radio link 170 to the subscriber terminal 260. The structure of frames transmitted on the bi-directional radio link 170 is also exactly defined, and it is called an air interface.

The subscriber terminal 260 can be a normal mobile phone, for instance, and a portable computer 152, for instance, can be attached to it by means of an expansion card and used in ordering and processing packets in packet transmission.

The base station controller 102 comprises a switching field 120 and a control unit 124. The switching field 120 is used to switch speech and data and to connect signalling circuits. A base station system made up of the base station 100 and the base station controller 102 also comprises a transcoder 122. The transcoder 122 usually resides as close as possible to a mobile switching centre 132, because it is then possible to transmit speech in cellular network format between the transcoder 122 and the base station controller 102, thus saving transmission capacity.

The transcoder 122 transforms different digital speech coding formats used between a public switched telephone network and a radio telephone network to suit each other, for instance from the 64 kbit/s format of a fixed network to a cellular radio network format (e.g. 13 kbit/s) and vice versa. The control unit 124 takes care of call control, mobility management, collection of statistics, and signalling.

As shown in FIG. 1A, connections (shown as black dots) can be made with the switching field 120 to both a public switched telephone network 134 through the mobile switching centre 132 and to a packet-switched network 142. A typical terminal 136 in the public switched telephone network 134 is a conventional phone or an ISDN (Integrated Services Digital Network) phone.

The connection between the packet transmission network 142 and the switching field 120 is established by a serving GPRS support node (SGSN) 140. The task of the serving GPRS support node 140 is to transmit packets between the base station system and a gateway GPRS support node (GGSN) 144, and to record the position of the subscriber terminal 260 in its area.

The gateway GPRS support node 144 connects a public packet transmission network 146 and the packet transmission network 142. An Internet protocol or an X.25 protocol can be used in the interface. The gateway GPRS support node 144 hides by encapsulation the internal structure of the packet transmission network 142 from the public packet transmission network 146 so that to the public packet transmission network 146, the packet transmission network 142 seems like a sub-network and the public packet transmission network 146 can address packets to and receive packets from the subscriber terminal 260 in it.

The packet transmission network 142 is typically a private network that uses an Internet protocol and transfers signalling and tunnelled user data. Depending on the operator, the structure of the network 142 may vary in its architecture and protocols below the Internet protocol layer.

The public packet transmission network 146 can be the Internet, for instance, and a terminal 148, such as a server, connected to it wants to transmit packets to the subscriber terminals 260.

Figure 1B:
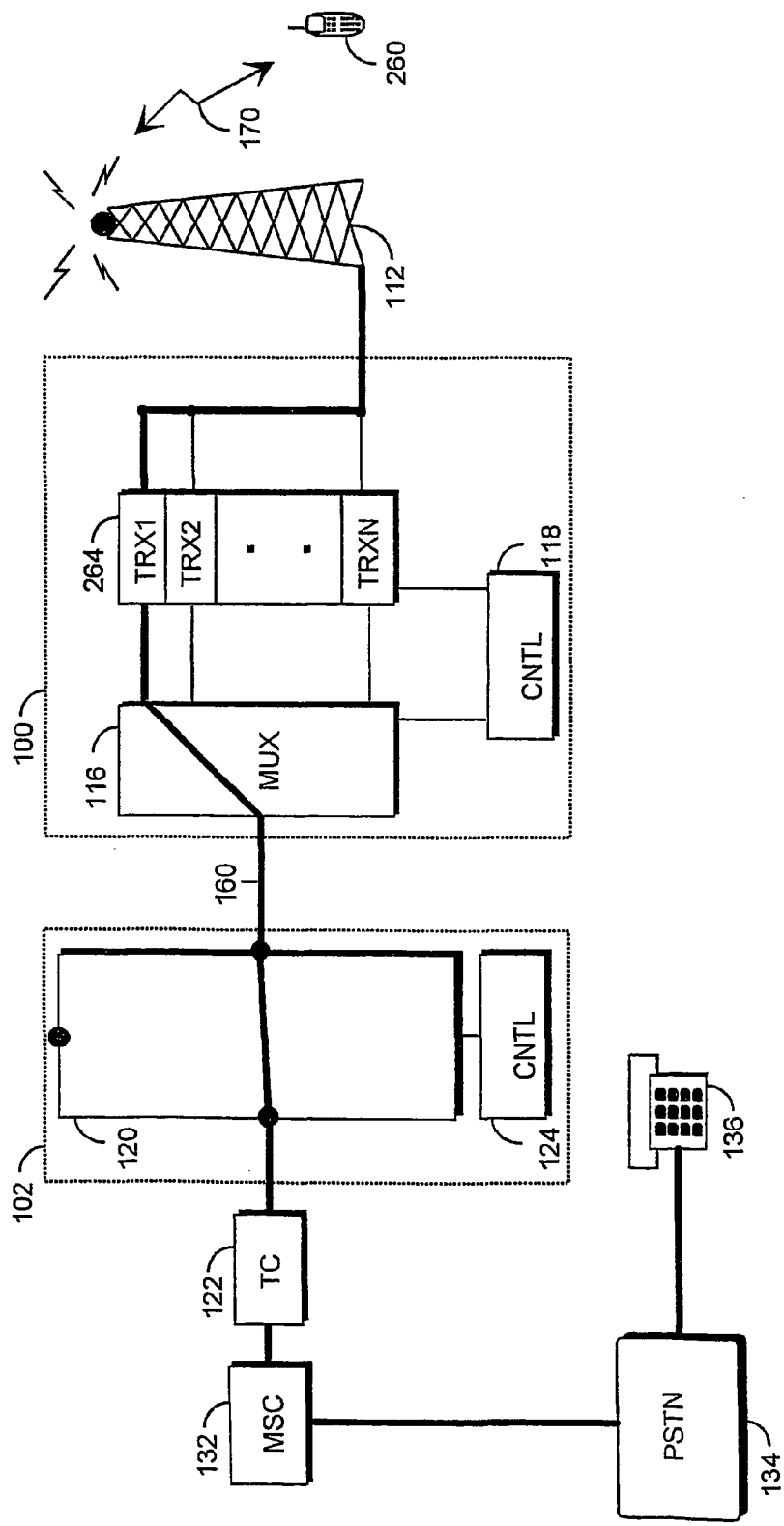
FIG. 1B shows the establishment of a circuit-switched transmission link between a subscriber terminal and a public switched telephone network.

FIG. 1B shows how a circuit-switched transmission link is established between the subscriber terminal 260 and the public switched telephone network terminal 136. In the figures, a thick line shows how data is transmitted through the system over an air interface 170 to an antenna 112, from the antenna to the transceiver 264 and from there, after multiplexing in the multiplexer 116, over the transmission link 160 to the switching field 120 which has an output to a connection between the switching field and the transcoder 122. Data is transmitted on from the mobile switching centre 132 through a connection to the terminal 136 connected to the public switched telephone network 134. In the base station 100, the control unit 118 controls the multiplexer 116 in performing the transmission, and in the base station controller 102, the control unit 124 controls the switching field 120 in making a correct connection to the transcoder 122.

FIG. 1C shows a packet-switched transmission link. A portable computer 152 is now connected to the subscriber terminal 260. A thick line shows how the data being transmitted advances from the server 148 to the portable computer 152. Data can naturally also be transmitted in the opposite transmission direction, i.e. from the portable computer 152 to the server 148. The data advances through the system over the air interface, i.e. Um interface, 170 from the antenna 112 to the transceiver 264, and from there, after multiplexing in the multiplexer 116, over the transmission link 160 in the Abis interface to the switching field 120, from which a connection has been established to an output to the serving GPRS support node 140 in the Gb interface. From the serving GPRS support node 140, the data is transmitted over the packet transmission network 142 through the gateway GPRS support node 144 to the server 148 connected to the public packet transmission network 146.

For clarity's sake, FIGS. 1B and 1C do not show a case where both circuit-switched and packet-switched data is transmitted simultaneously. This is, however, completely possible and common, since free capacity can flexibly be taken into use from circuit-switched data transmission to packet-switched transmission. A network can also be built, in which only packet data is transmitted. In such a case, the structure of the network can be simplified.

Let us yet again examine FIG. 1C. The network part of the cellular packet network accordingly comprises the base station 100 and the transceiver 264 implementing the Um interface in the base station 100.

In addition to above, GPRS has two specific elements: a channel codec unit CCU and a packet control unit PCU. The tasks of CCU include channel coding including FEC (Forward Error Coding), interleaving and incremental redundancy combination, radio channel measuring functions, such as the quality level of the received signal, reception power of the received signal, and information related to the measurement of timing advance. The tasks of PCU include LLC (Logical Link Control) frame segmentation and reassembly, ARQ (Automatic Repeat Request) functions, PDCH (Packet Data Channel) scheduling, channel access control, and radio channel management functions.

CCU 182 resides in the base station 100 and depending on the implementation, it can be considered to be a time-slot-specific or transceiver-specific unit. PCU 180A/180B is connected to CCU 182 over the Abis interface. PCU can reside in the base station 100, base station controller 102, or serving GPRS support node 140. FIG. 1C shows PCU in the base station controller 102 or serving GPRS support node 140, but for clarity's sake, not in base station 100.

In the following examples, the first transceiver is a subscriber terminal and the second transceiver is a base station transceiver, without being limited to these solutions, however.

Let us next examine a method according to a preferred embodiment of the invention. The first transceiver transmits data to the second transceiver in data blocks. For the second transceiver to identify the data blocks, the first transceiver gives the data blocks identifiers from a finite identifier space. In this example, the identifier space comprises identifiers 0, 1, 2, and 3. Like the data blocks, the identifiers are also in bit format. The identifiers are reserved cyclically in such a manner that when the last identifier is used, the cycle starts from the beginning. The second transceiver maintains information on the position of a window belonging to the finite identifier space. In this example, the size of the window is two identifiers. In a preferred embodiment of the invention, the size of the window can generally be at most half of the size of the identifier space. The identifiers thus repeat in cycles in the data blocks. In other words, data blocks of different cycles have the same identifiers and correspondingly positions according to the identifiers in the window space, even though typically, the data blocks of different cycles comprise different data and are different data blocks. Data blocks having the same identifier in the same cycle are the same data blocks.

Let us examine FIG. 2, in which a table illustrates a method of a preferred embodiment. The leftmost column numbers different time instants, the next column gives the identifier of the data block being transmitted at each time, the following column indicates the success of the decoding of the received data block, the next column shows the position of the window maintained by the second transceiver, and the rightmost column shows the content of the memory of the second transceiver. The identifier space comprises the identifiers 0, 1, 2, and 3. In FIG. 2, at time instant 0, the second transceiver receives a data block having the identifier 0. The reception is successful. The window maintained by the second transceiver comprises the identifiers 0 and 1 in this situation. In the table of FIG. 2, the window is marked W. The memory, to which the data blocks whose reception fails are stored, is empty. At time instant 1, the reception of a data block having the identifier 1 to the second transceiver fails. This data block is then stored temporarily to the reception memory. The second transceiver signals to the first transceiver a need to retransmit. At time instant 2, the second transceiver re-receives the data block having the identifier 1. The receiver knows that there is a data block equipped with the same identifier in the reception memory, and since the identifier (1) in question has been in the window all the time, the data blocks are the same and they can be combined. The combination is decoded successfully and the reception memory can now be emptied.

At time instant 3, the second transceiver re-receives the same data block equipped with the identifier 1 that the first transceiver has transmitted erroneously for instance due to faulty signalling. The reception of this data block fails and the data block is stored in the reception memory. At time instant 4, the first transceiver transmits a block equipped with the identifier 2, and the second transceiver fails to decode it. The identifier 2 is not in the identifier space window maintained by the second transceiver, so the window is shifted to bring the identifier 2 inside it. After the shift, the window comprises the values 1 and 2. The block whose reception failed is stored into the memory. At time instant 5, the second transceiver re-receives the block equipped with the identifier 2. The reception memory contains a data block having the same identifier, and because the identifier (2) has been in the window all the time, the data blocks are the same and can be combined. The combination is decoded successfully and the block can be deleted from the reception memory.

At time instant 6, the second transceiver receives a data block having the identifier 3 and decodes it successfully. The identifier 3 is not in the identifier space window maintained by the second transceiver, so the window is shifted to bring the identifier 3 inside it. After the shift, the window comprises the values 2 and 3. The identifier 1 is thus outside the window. The stored data block having the identifier 1 whose decoding failed is deleted from the memory. At time instant 7, the second transceiver receives a data block having the identifier 0, and the window shifts cyclically in such a manner that it contains the identifiers 3 and 0. At time instant 8, the second transceiver receives a data block having the identifier 1, but does not combine it with the data block equipped with the same identifier and received earlier at time instant 3, because the identifier 1 has been outside the window since the transmission at time instant 3. In practice, combination was prevented in the presented embodiment in such a manner that the block was already deleted from the memory when it dropped out of the window at time instant 6.

There are three different methods to shift, i.e. update the position of, the window in the identifier space. In the first method, when the second transceiver receives a data block that has no position according to its identifier in the window, the second transceiver shifts the window in such a manner that said position according to the identifier settles last in the window. The first method was described above in FIG. 2. In the second method, the packet control unit 180A/180B containing the ARQ protocol implementation transmits to the channel codec unit 182 a signal that comprises information on the position of the window of the second transceiver in the identifier space. In comparison with the first method, the second method requires more signalling. In the third method, the channel codec unit 182 examines the ACK (acknowledgement) messages, i.e. messages comprising information that no more retransmissions are needed, transmitted from the packet control unit 180A/180B through the channel codec unit to the subscriber terminal. The drawback in the third method is that the ACK messages can be complex to the channel codec unit, which shows as difficulties in decoding.

Figure 3:
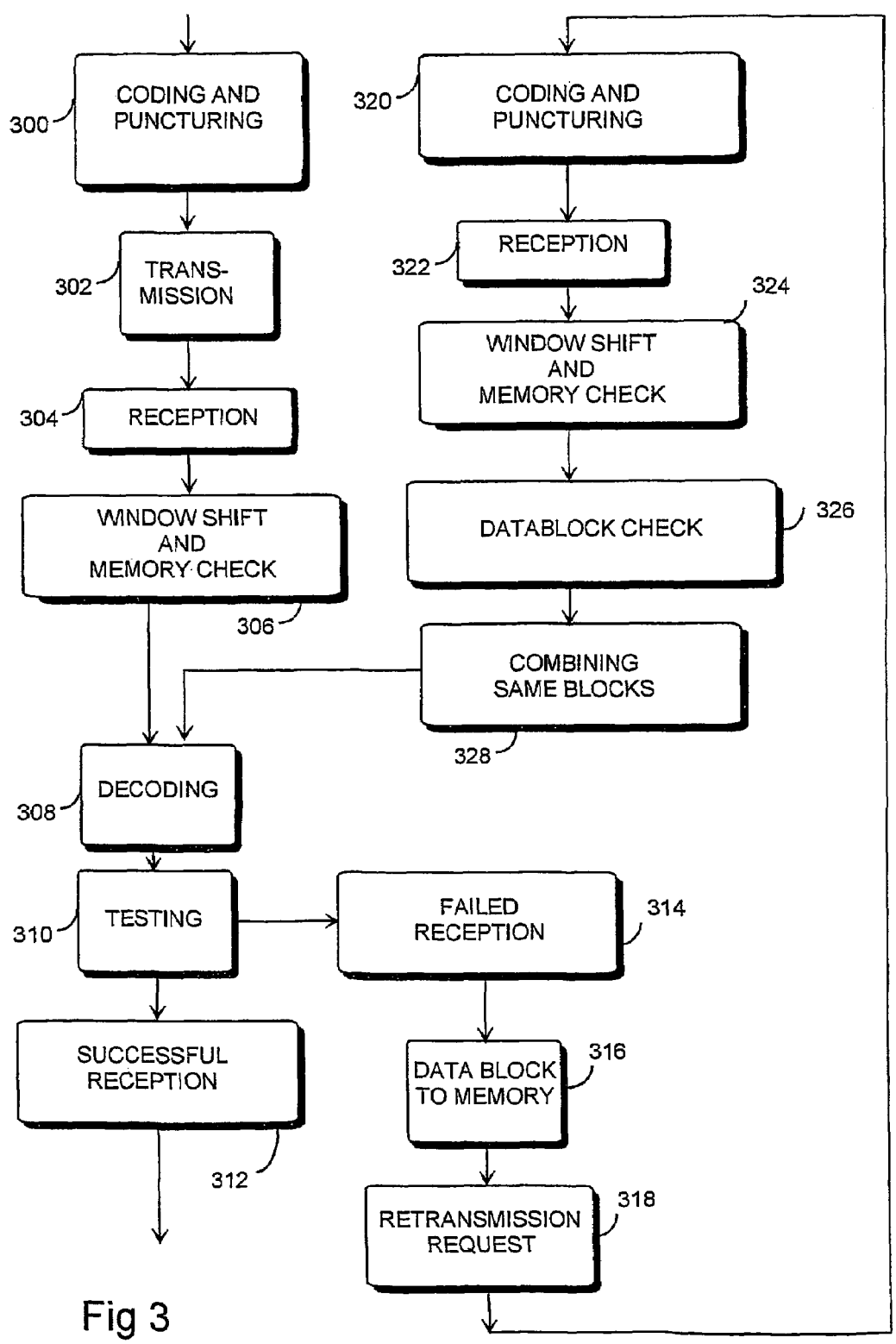
FIG. 3 shows a method block diagram of a second preferred embodiment of the invention.

Next, a preferred embodiment of the invention for transmitting data from the first transceiver to the second transceiver is described by means of the method block diagram of FIG. 3. In the method, the first transceiver transmits information in data blocks to the second transceiver. The blocks comprise identifiers that are reserved cyclically from a finite identifier space. The second transceiver maintains information on the position of a window belonging to the finite identifier space, and this information is utilised in combining re-received blocks. The following example describes a possible implementation, but the preferred embodiments of the invention are not limited to the described signalling methods, as is clear to a person skilled in the art.

The execution of the method is started from block 300 in the block diagram. In block 300, a data block is channel-coded in the first transceiver to a coded data block using a selected channel coding method.

In block 302, the first transceiver transmits the coded data block to the second transceiver. In block 304, the second transceiver receives the data block from the first transceiver. If the position according to the identifier of the received data block is not in the window, the second transceiver shifts the window in the identifier space it maintains to bring the position according to the identifier of the data block in question to the window following the window shift. The reception memory is also checked and if after the window shift, it contains a data block whose position according to its identifier is not in the window following the window shift, said data block is deleted from the reception memory. This takes place in block 306.

Next, the received data block is decoded in block 308 of the block diagram. Block 310 tests the success or failure of the reception of the data block. If the reception of the data block is successful 312, the procedure can start from the beginning to transmit a new data block.

If the test in block 310 shows that the decoding has failed (block 314), the data block whose reception failed is stored in the reception memory in block 316. Failed reception usually means that the second transceiver could not decode the received data block. This is detected either with an error detection code or in that the error correcting code cannot at a sufficient accuracy correct the errors occurred in the channel. If the second transceiver cannot decode the data block, the data block needs to be retransmitted.

Next, in block 318, a retransmission request of the data block is transmitted from the second transceiver to the first transceiver. The retransmission request can be a NACK (Negative Acknowledgement) message, for instance. Correspondingly, when no more retransmissions are necessary, an ACK (Acknowledgement) message can be transmitted. In practice, this can be done in such a manner, for instance, that when CCU detects an error, it transmits a bad frame indicator to PCU and PCU generates a NACK message and transmits it to CCU for transmission to the radio path.

As a result of this retransmission request, the first transceiver retransmits the coded data block in block 320 to the second transceiver.

The second transceiver receives the retransmitted data block in block 322, after which the window and reception memory are checked in block 324. If the position according to the identifier of the received data block is not in the window, the second transceiver shifts the window in the identifier space it maintains to bring the position according to the identifier of the data block to the window following the window shift. The reception memory is also checked and if after the window shift, it contains a data block whose position according to its identifier is not in the window following the window shift, said data block is deleted from the reception memory. These actions are always related to the reception of a data block. Next, the second transceiver checks in block 326 whether the retransmitted data block and the earlier received data block are the same. The check is done in such a manner that if the earlier received data block according to the identifier in question is in the reception memory, the retransmitted data block and the earlier received data block are considered the same.

Next, in block 328, the coded data block whose reception failed and the re-received coded data block that are considered the same are combined. The combination can be done, because both data blocks are different versions of the same coded data block. Finally, in block 308, the channel coding of the combined coded data blocks is decoded. The decoding is done in the same manner as the decoding of a single data block. Because it has been verified by means of the preferred embodiment of the invention that the data blocks to be combined are data blocks having the same identifier and cycle, i.e. the same data blocks, decoding will succeed. The decoding of the channel coding produces the data block containing user data.

A retransmission need can also be detected in the case of other data blocks than those whose reception fails. The data blocks that were received successfully but need to be retransmitted can be subjected to the same method steps as described above in the case of data blocks whose reception failed. It is, however, not very sensible to store a data block into the reception memory and combine and decode it, if it was already once successfully received.

Let us next examine a second preferred embodiment of the invention by means of FIG. 4. In this embodiment, the second transceiver, when receiving data blocks from the first transceiver, marks as successfully received the identifiers of the data blocks that it can decode, i.e. that are not defective.

In the example of FIG. 4, the identifiers of the data blocks and the successful transmissions and decodings are similar to those described in the example of FIG. 2. Successfully decoded data blocks are marked with O in the windowing table of FIG. 4. At time instant 0, a block having the identifier 0 is received and decoded successfully. Said block is marked as having been received successfully. A data block having the identifier 1 and received with errors at time instant 1 is not marked as having been received successfully. It is stored in the reception memory. At time instant 2, the retransmitted block having the identifier 1 is received and this time, it can be decoded successfully. It is marked as successfully received. At time instant 3, an unnecessarily retransmitted data block having the identifier 1 is received. Because said data block was already marked as successfully received, it is not stored in the reception memory, as was done in the example of FIG. 2. This way, memory usage is more efficient than in the alternative described earlier.

Figure 5:
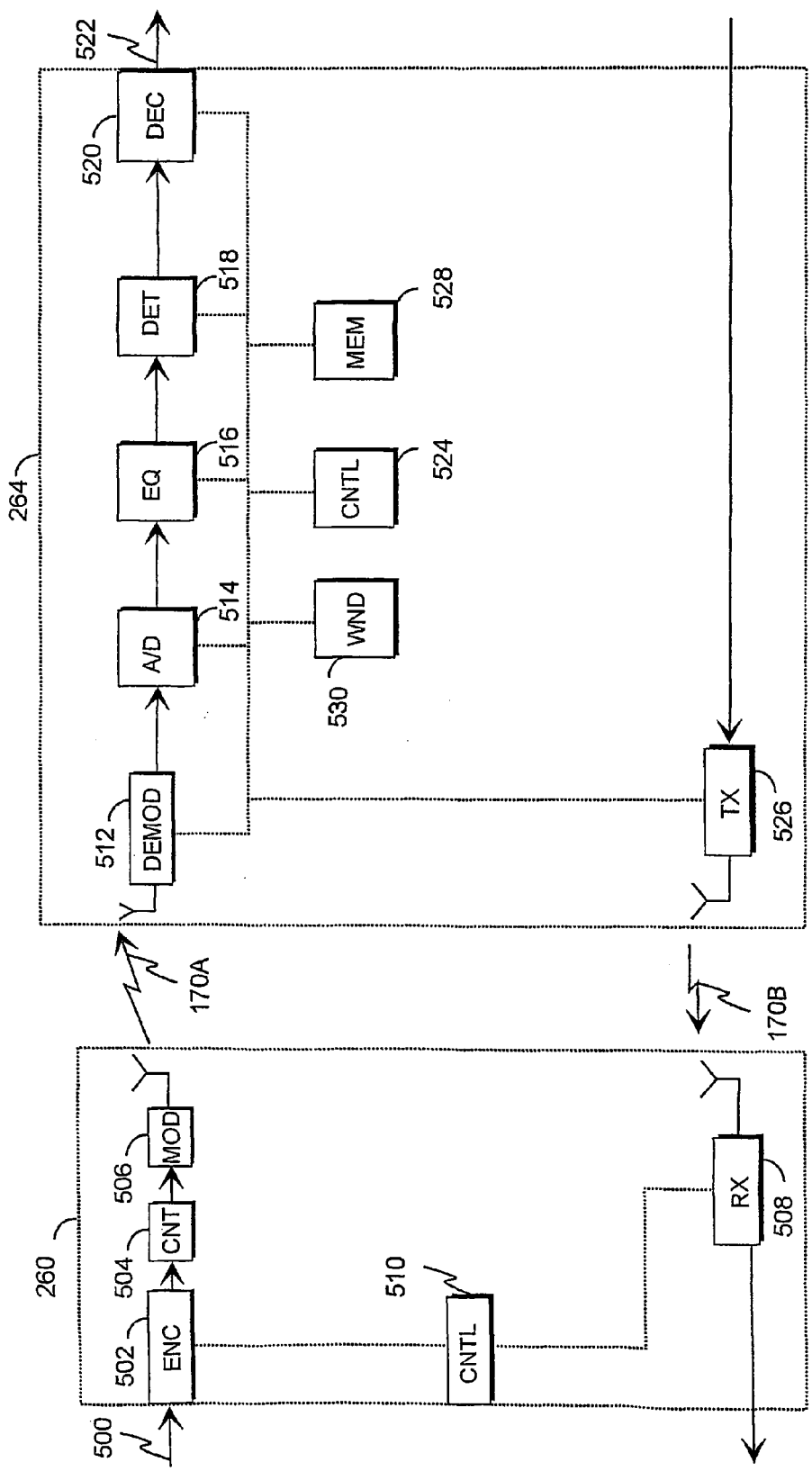
FIG. 5 illustrates an example of the structure of a first and a second transceiver.

Let us examine more closely the implementation of the first and second transceivers by means of FIG. 5. Only the parts of the transceivers that are essential for the invention are described. The first transceiver 260 and the second transceiver 264 have already been described in the examples of FIGS. 1A to 1C, in which the first transceiver 260 is a subscriber terminal and the second transceiver 264 is a base station transceiver.

The first transceiver 260 comprises a channel codec 500 for channel coding a data block 502 to a coded data block using a selected channel coding method and for puncturing the coded data block. The channel codec is operationally connected to means 504 for attaching identifiers to data blocks for identification. The identifiers are selected cyclically from a finite identifier space. The means 504 are implemented by means of a counter, for instance. The first transceiver 260 further comprises a modulator 506 that modulates digital signals to a radio-frequency carrier and transmits data 170A to the second transceiver 264 and, when necessary, retransmits data blocks to the second transceiver. The first transceiver also comprises means 508 for receiving a retransmission request sent by the second transceiver 264. The transceiver also comprises a control block 510 that controls the operation of the different parts of the device. The control block is typically implemented by means of a processor and suitable software. In addition, the first transceiver 260 can comprise filters and power amplifiers and other parts known to a person skilled in the art.

The second transceiver 264 comprises reception means 512 for receiving data blocks transmitted by the first transceiver 260. The reception means 512 comprise a filter that prevents frequencies outside a desired frequency band. Next, the signal is converted to an intermediate frequency or directly to baseband, and the resulting signal is sampled and quantized in an analogue-to-digital converter 514. A possible equalizer 516 compensates for interference caused by multipath propagation, for instance.

From the equalizer, the signal is forwarded to a detector 516, from which the detected signal is forwarded to a channel decoder 520 that decodes the received coded data block. From the decoder, the signal 522 is forwarded to other parts of the transceiver.

The second transceiver 264 further comprises control means 524 for detecting a retransmission need of a received coded data block, i.e. whether the data block could be decoded or not, and a reception memory 528, to which data blocks whose reception fails are stored. The transceiver further has means 526 for transmitting, controlled by the control means and using the radio link 170B, a retransmission request of a coded data block to the first transceiver 260.

The second transceiver 264 further comprises means 524 for combining data blocks defined as the same. The channel decoder 520 decodes the channel coding of the combined coded data block.

The second transceiver 264 comprises means 530 for maintaining a window in a section of a finite identifier space, and windowing means 524, 530 for windowing received data blocks to positions according to the identifiers they comprise in the window of the identifier space and, when a data block is received whose position according to its identifier is not in the window, for shifting the window in the identifier space in such a manner that the position according to the identifier of the received data block is in the window following the shift.

The control block 524 of the second transceiver also takes care of deleting the data block from the reception memory 528 if the position according to the identifier of the data block is not in the window following the window shift. In some of the preferred embodiments of the invention, the control block takes care of marking a successfully received data block as successfully received.

The method steps used in the preferred embodiments of the invention are implemented by programs in the transceivers. A hardware implementation is also possible, for instance ASIC (Application Specific Integrated Circuit) or a control logic built of separate components.

In addition to incremental redundancy, the preferred embodiments of the invention can also be utilised in an implementation in which the EGPRS service is generally used. Another possible implementation is that a packet control unit at a distance from the base station controls the operation of the base station.

Even though the invention has been explained in the above with reference to examples in accordance with the accompanying drawings, it is obvious that the invention is not restricted to them but can be modified in many ways within the scope of the inventive idea disclosed in the attached claims.

The invention claimed is:

1. A method, comprising:
reserving identifiers cyclically from a finite identifier space;
attaching identifiers to data blocks to be transmitted for identification;
transmitting the data blocks from a first transceiver;
receiving the data blocks by a second transceiver;
maintaining information at the second transceiver on the position of an incremental redundancy specific window belonging to the finite identifier space; and
when reception of a data block of the data blocks by the second transceiver fails,
  storing at the second transceiver the data block into a reception memory,
  retransmitting said data block from the first transceiver with the same identifier as the original transmission,
  re-receiving said data block by the second transceiver,
  comparing at the second transmitter the identifiers of a re-received data block and an earlier received data block with each other,
  defining the re-received data block and the earlier received data block as the same, if the re-received data block and the earlier received data block have a same identifier and it is detected that said same identifier has been in the incremental redundancy specific window maintained by the second transceiver continuously from a reception time of the earlier received data block to a reception time of the re-received data block, and
  combining the data blocks defined as the same.

2. The method of claim 1, wherein when the second transceiver receives a particular data block of the data blocks whose identifier is not in the incremental redundancy specific window, the second transceiver shifts the incremental redundancy specific window cyclically forward in the identifier space in such a manner that the identifier is in the incremental redundancy specific window following the window shift.

3. The method of claim 2, wherein when after the window shift the reception memory contains the data block of the data blocks whose position according to its identifier is not in the incremental redundancy specific window following the window shift, said data block is deleted from the reception memory.

4. The method of claim 3, wherein if an earlier received data block having a same identifier as the particular data block is in the reception memory, the re-received particular data block and the earlier received data block are defined as the same.

5. The method of claim 1, wherein information is maintained for each identifier belonging to the incremental redundancy specific window on whether a corresponding data block corresponding to the identifier was successfully received.

6. The method of claim 5, wherein when reception fails for a particular data block, but the particular data block's identifier has a marking of a successful reception, the particular data block is not stored in the reception memory.

7. A radio system, comprising:
a first transceiver; and
a second transceiver,
wherein the first transceiver and the second transceiver are in radio contact with each other,
wherein the first transceiver comprises
  a data block formation unit configured to form data blocks for transmission in such a manner that the data blocks are given identifiers for identification, the identifiers being reserved cyclically from a finite identifier space,
  a first reception unit configured to receive a retransmission request transmitted by the second transceiver, and
  a first transmission unit configured to transmit the data blocks to the second transceiver and for re-transmitting a requested data block to the second transceiver, and
wherein the second transceiver comprises
  a second reception unit configured to receive the data blocks transmitted by the first transceiver and for receiving the requested data block retransmitted by the first transceiver,
  a detection unit configured to detect a failure in the reception of a particular data block,
  a reception memory to which the particular data block whose reception fails is stored,
  a second transmission unit configured to transmit to the first transceiver a retransmission request of the requested data block,
  a maintenance unit configured to maintain information on the position of an incremental redundancy specific window belonging to the finite identifier space,
  a comparison unit configured to compare identifiers of the requested data block and the particular data block with each other and for defining the requested data block and the particular data block as the same, if they have a same identifier and said identifier has been in the increniental redundancy specific window maintained by the second transceiver continuously from a reception time of the particular data block to the reception time of the requested data block, and
  a combination unit configured to combine data blocks defined as the same.

8. The radio system of claim 7, wherein the second transceiver further comprises means for shifting the incremental redundancy specific window in the identifier space, when the second transceiver receives a specific data block whose identifier is not in the incremental redundancy specific window, in such a manner that the position of the identifier of the specific data block is in the incremental redundancy specific window following the window shift.

9. The radio system of claim 8, wherein the second transceiver further comprises a deletion unit configured to delete the particular data block from the reception memory, if the position of the identifier of the particular data block is not in the incremental redundancy specific window following the window shift.

10. The radio system of claim 9, wherein the second transceiver further comprises a definition unit configured to define a re-received data block and an earlier received data block as the same, if the position according to an identifier of the re-received identifier is in the incremental redundancy specific window and if the reception memory contains an earlier received data block having a same identifier as the re-received data block.

11. The radio system of claim 7, wherein the second transceiver further comprises a marking unit configured to mark a successfully received data block as successfully received.

12. A receiver, comprising:
reception means for receiving data blocks transmitted by the transmitter of the radio system and for receiving a requested data block retransmitted by the transmitter, the data blocks comprising identifiers reserved cyclically from a finite identifier space;
detection means for detecting a failure in the reception and decoding of a data block of the data blocks;
storage means for storing the data block whose reception fails;
maintenance means for maintaining information on a position of an incremental redundancy specific window belonging to the finite identifier space;
comparison means for comparing identifiers of a re-received data block and an earlier received data block with each other and for defining the re-received data block and the earlier received data block as the same, if the re-received data block and the earlier received data block have a same identifier and said same identifier has been in the incremental redundancy specific window maintained by the maintenance means continuously from a reception time of the earlier received data block to a reception time of the re-received data block;
combination means for combining and decoding data blocks defined as the same.

13. A method, comprising:
receiving data blocks transmitted and retransmitted by a transmitter, the data blocks comprising identifiers reserved cyclically from a finite identifier space;
maintaining information on a position of an incremental redundancy specific window belonging to the finite identifier space; and
when the reception of a data block of the data blocks fails,
storing the data block into a reception memory as an earlier received data block,
re-receiving the data block as a re-received data block,
comparing identifier of the re-received data block and the earlier received data block,
defining that the earlier received data block and the re-received data block are the same, if the earlier received data block and the re-received data block have a same identifier and if it is detected that said same identifier has been in the incremental redundancy specific window maintained by the receiver continuously from a reception time of the earlier received data block to a reception time of the re-received data block, the detection being based on the information on the position of the incremental redundancy specific window, and
combining and decoding data blocks defined as the same.

14. A mobile station, comprising:
reception means for receiving data blocks transmitted by a transmitter of a radio system and for receiving a data block retransmitted by the transmitter, the data blocks comprising identifiers reserved cyclically from a finite identifier space, and the mobile station configured to be in radio contact in a radio system with the transmitter;
detection means for detecting a failure in the reception and decoding of a particular data block of the data blocks;
storage means for storing the particular data block whose reception fails;
maintenance means for maintaining information on a position of an incremental redundancy specific window belonging to the finite identifier space, and
comparison means for comparing the identifiers of a re-received data block and an earlier received data block with each other and for defining the re-received data block and the earlier received data block as the same, if they have a same identifier and said same identifier has been in the incremental redundancy specific window maintained by the maintenance means continuously from a reception time of the earlier received data block to a reception time of the re-received data block, and
combination means for combining and decoding data blocks defined as the same.

15. A base station, comprising:
reception means for receiving data blocks transmitted by a transmitter of a radio system and for receiving a data block retransmitted by the transmitter, the data blocks comprising identifiers reserved cyclically from a finite identifier space, and the base station configured to be in radio contact in the radio system with the transmitter;
detection means for detecting a failure in the reception and decoding of a particular data block of the data blocks;
storage means for storing the particular data block whose reception fails,
maintenance means for maintaining information on a position of an incremental redundancy specific window belonging to the finite identifier space, and
comparison means for comparing identifiers of a re-received data block and an earlier received data block with each other and for defining the data blocks as the same if they have a same identifier and said same identifier has been in the incremental redundancy specific window maintained by the maintenance means continuously from a reception time of the earlier received data block to a reception time of the re-received data block, and
combination means for combining and decoding data blocks defined as the same.

16. A receiver, comprising:
a demodulator configured to receive data blocks transmitted by a transmitter of a radio system and to receive a data block retransmitted by the transmitter, the data blocks comprising identifiers reserved cyclically from a finite identifier space, and the receiver configured to be in radio contact in the radio system with the transmitter;

a controller configured to detect a failure in the reception and decoding of a particular data block of the data blocks;

a reception memory to which the particular data block whose reception fails is stored;

a control logic configured to maintain information on a position of an incremental redundancy specific window belonging to the finite identifier space;

a controller configured to compare identifiers of a re-received data block earlier received data block with each other and to define the re-received data block and the earlier received data block as the same if they have a same identifier and said same identifier has been in the incremental redundancy specific window maintained by the control logic continuously from a reception time of the earlier received data block to a reception time of the re-received data block;

a controller configured to combine and decode data blocks defined as the same.

17. A radio system, comprising:

a first transceiver; and a second transceiver, wherein the first transceiver and the second transceiver are in radio contact with each other, wherein the first transceiver comprises means for forming data blocks for transmission in such a manner that the data blocks are given identifiers for identification, the identifiers being reserved cyclically from a finite identifier space, means for receiving a retransmission request transmitted by the second transceiver, and means for transmitting the data blocks to the second transceiver and for re-transmitting a requested data block to the second transceiver, and wherein the second transceiver comprises means for receiving the data blocks transmitted by the first transceiver and for receiving the requested data block retransmitted by the first transceiver, means for detecting a failure in the reception of a particular data block, means for storing the particular data block whose reception fails, means for transmitting to the first transceiver a retransmission request of the requested data block, means for maintaining information on the position of an incremental redundancy specific window belonging to the finite identifier space, means for comparing identifiers of the requested data block and the particular data block with each other and for defining the requested data block and the particular data block as the same, if they have a same identifier and said identifier has been in the incremental redundancy specific window maintained by the second transceiver continuously from a reception time of the particular data block to the reception time of the requested data block, and means for combining data blocks defined as the same.

* * * * *

UNITED STATES PATENT AND TRADEMARK OFFICE
CERTIFICATE OF CORRECTION

Page 1 of 1

PATENT NO. : 7,254,412 B2
APPLICATION NO. : 10/450998
DATED : August 7, 2007
INVENTOR(S) : Jussi Sipola It is certified that error appears in the above-identified patent and that said Letters Patent is hereby corrected as shown below:

Column 15:

Lines 9-10 (claim 16), after "re-received data block" please add --and--

Signed and Sealed this
Eighteenth Day of October, 2011

David J. Kappos
*Director of the United States Patent and Trademark Office*